(12) United States Patent
Heil

(10) Patent No.: US 8,255,887 B2
(45) Date of Patent: Aug. 28, 2012

(54) METHOD AND APPARATUS FOR RE-USING MEMORY ALLOCATED FOR DATA STRUCTURES USED BY SOFTWARE PROCESSES

(75) Inventor: Timothy Hume Heil, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1155 days.

(21) Appl. No.: 11/564,345

(22) Filed: Nov. 29, 2006

(65) Prior Publication Data

US 2008/0126736 A1    May 29, 2008

(51) Int. Cl.
G06F 9/45 (2006.01)
(52) U.S. Cl. .................... 717/141; 717/154; 717/159
(58) Field of Classification Search .................. None
See application file for complete search history.

(56) References Cited

U.S. PATENT DOCUMENTS

| | | | | |
|---|---|---|---|---|
| 5,717,902 | A * | 2/1998 | D'Souza et al. | 717/162 |
| 6,065,019 | A * | 5/2000 | Ault et al. | 1/1 |
| 6,144,970 | A * | 11/2000 | Bonner et al. | 1/1 |
| 6,173,442 | B1 * | 1/2001 | Agesen et al. | 717/141 |
| 6,473,773 | B1 * | 10/2002 | Cheng et al. | 707/814 |
| 6,564,374 | B1 * | 5/2003 | Jaaskelainen, Jr. | 717/159 |
| 7,076,774 | B2 * | 7/2006 | Chrysanthakopoulos et al. | 717/159 |
| 7,086,041 | B2 * | 8/2006 | Plesko et al. | 717/141 |
| 7,096,238 | B2 * | 8/2006 | Garthwaite | 1/1 |
| 7,275,242 | B2 * | 9/2007 | Liu et al. | 717/159 |
| 7,356,813 | B2 * | 4/2008 | Liu et al. | 717/154 |
| 7,617,489 | B2 * | 11/2009 | Peyton et al. | 717/141 |
| 7,685,581 | B2 * | 3/2010 | Plesko et al. | 717/141 |
| 7,765,528 | B2 * | 7/2010 | Findeisen et al. | 717/154 |
| 7,861,231 | B2 * | 12/2010 | Rangarajan et al. | 717/130 |
| 8,006,229 | B2 * | 8/2011 | Shinomi | 717/159 |
| 8,156,483 | B2 * | 4/2012 | Berg et al. | 717/154 |
| 2004/0068719 | A1 * | 4/2004 | Liu et al. | 717/154 |
| 2004/0158819 | A1 * | 8/2004 | Cuomo et al. | 717/159 |
| 2004/0268328 | A1 * | 12/2004 | Plesko et al. | 717/141 |
| 2009/0119654 | A1 * | 5/2009 | Kawahito et al. | 717/154 |

OTHER PUBLICATIONS

Efficient Detection of All Pointer and Array Access Errors, Todd M. Austin, et al. Proceedings of the SIGPLAN, 1994 Conference on Programming Language Design and Implementation.*
Garbage Collection—Algorithms for Automatic Dynamic Memory Mament, Richard Jones, et al. John Wiley & Sons Ltd, 1996, pp. 5, 175, 176.*
Compilers—principles, Techniques, & Tools, Alfred V. Aho, et al, Addison Wesley, second edition, pp. 4, 5.*
"The American Heritage College dictionary", $4^{th}$ edition, 2002, pp. 1238.*
Microsoft, "Computer Dictionary", $5^{th}$ edition, 2002, pp. 148.*

(Continued)

*Primary Examiner* — Thuy Dao
*Assistant Examiner* — Xi D Chen
(74) *Attorney, Agent, or Firm* — Roy W. Truelson

(57) ABSTRACT

A memory management mechanism requires data structures to be explicitly deallocated in the programming code, but deallocation does not immediately make the memory available for reuse. Before a deallocated memory region can be reused, memory is scanned for pointers to the deallocated region, and any such pointer is set to null. The deallocated memory is then available for reuse. Preferably, deallocated memory regions are accumulated, and an asynchronous memory cleaning process periodically scans memory to nullify the pointers. In order to prevent previously scanned memory becoming contaminated with a dangling pointer before the scan is finished, any write to a pointer is checked to verify that the applicable target address has not been deallocated.

20 Claims, 8 Drawing Sheets

OTHER PUBLICATIONS

Rationonal, "Rational PurifyPlus for Linux User Guid Version: 2003.06.00 UNIX", 2003. [retrieved on May 13, 2011]. Retrieved from internet <URL:ftp://ftp.software.ibm.com/software/rational/docs/v2002/pplx-ug.pdf> pp. 1-196.*

Derek White, Alex Garthwaite, "The GC Interface in the EVM", Dec. 1998. [retrieved on May 12, 2011]. Retrieved from internet<URL:http://citeseerx.ist.psu.edu/viewdoc/download?doi=10.1.1.68.7907&rep=rep1&type=pdf#page=279>; pp. 1-21.*

Gay, et al., "Safe Manual Memory Management", Oct. 2007, ACM; [retrieved on Apr. 12, 2012]; Retrieved from Internet <URL:http://dl.acm.org/citation.cfm?id=1296911>; pp. 1-14.*

Eigler, "Mudflap: Pointer Use Checking for C/C++", GCC Developers Summit, 2003; [retrieved on Apr. 12, 2012]; Retrieved from Internet <URL:http://artfiles.org/cygwin.org/pub/gcc/summit/2003/mudflap.pdf>; pp. 1-14.*

Cho, et al., "A new approach to detecting memory access errors in C programs", 2007, IEEE; [retrieved on Apr. 12, 2012]; Retrieved from Internet <URL:http://ieeexplore.ieee.org/stamp/stamp.jsp?tp=&arnumber=4276495>; pp. 1-6.*

Trevor, J. et al., "Cyclone: A safe dialect of C" (AT&T Labs Research, publication date unknown).

Austin, T. et al., "Efficient Detection of All Pointer and Array Access Errors", Proceedings of the SIGPLAN '94 Conference on Programming Language Design and Implementation (1994).

Boehm, H. et al., "Garbage Collection in an Uncooperative Environment" (John Wiley & Sons 1988).

Wilson, P., "Uniprocessor Garbage Collection Techniques" (publication date unknown).

Richter, J., "Garbage Collection: Automatic Memory Management in the Microsoft .NET Framework" (MSDN Magazine, Nov. 2000).

* cited by examiner

METHOD AND APPARATUS FOR RE-USING MEMORY ALLOCATED FOR DATA STRUCTURES USED BY SOFTWARE PROCESSES

FIELD OF THE INVENTION

The present invention relates to digital data processing, and in particular to methods and apparatus for re-using memory allocated for data structures being used by a software process when the process no longer requires the data.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which form a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software with enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed. In particular, a large and varied set of high-level languages was developed for supporting the creation of computer software.

Typically, high-level languages represent instructions, fixed values, variables, and other constructs in a manner readily understandable to the human programmer rather than the computer. Such programs are not directly executable by the computer's processor. In order to run on the computer, the programs must first be transformed from a human-readable form (source code) to something executable by the computer. In general, source code is universal and understandable by anyone trained to use the applicable language, while executable code is specific to a particular computer system environment (model of hardware, operating system, etc.), and can only execute on that computer system or one similarly configured.

Most high-level language programs support some form of memory allocation and re-use during run-time, i.e. during execution. I.e., certain state variables needed by the program may be relatively small and fixed in size and number, so that space for these may be allocated before the program is executed. But in the case of much of the data read or generated by the program, the volume of memory required is large and/or it is not known in advance how much memory will be needed. For such data, available free memory is allocated for the data as needed during program execution. Often, the need for such data is very transient, and once a particular block of code has been executed, the data is no longer needed. Certain high-level languages in particular tend to generate a large number of such temporary data structures. If temporary data is allowed to permanently occupy addressable memory space and accumulate in addressable memory, the program will consume far more memory than they actually need at any one time during execution, and the addressable memory capacity of the system may be taxed. Therefore, such temporarily needed memory space is generally re-used by allocating it to some other data after the original temporary data is no longer needed.

The re-use of memory space for different data in an executing program introduces an issue generally referred to as type-safety. Programming languages support different types of data, i.e., data represented internally in different formats. A data structure for which memory is allocated has a specified internal format according to the programming language semantics and directions of the programmer. Any subsequent reference to the data in the program expects to see data in the specified format. Most high-level languages support some form of pointer to memory locations containing data. Pointers may be stored as variables, just as any other data.

If memory space is initially allocated to data in one format, and subsequently re-used for data in a different format, it is possible that a pre-existing pointer ("dangling pointer") will erroneously be used to access data in a different format from that which was expected, referred to as a type violation. Results of such an operation are unpredictable. Such type violations can be very difficult for the programmer to diagnose. The issue of type-safety is well-known in the programming community. Some programming languages provide greater protection from type violations, i.e., greater "type-safety", than others. However, greater type-safety generally comes at a cost in efficiency and/or programming flexibility.

A common approach to type-safety is garbage collection. Various garbage collection techniques are known in the art, but in general garbage collection is a process in which the program state data is first analyzed to find all pointer references, and from this determine all dynamically allocated memory which is no longer referenced by any pointer. The unused memory is then made available for re-use. Garbage collection can be performed serially, i.e., by temporarily halting program execution, or in parallel using a separate thread running in parallel with the main application thread(s), or incrementally, periodically pausing the application for a short period of time to do a small piece of the larger garbage collection process. Incremental collection involves greater complexity than serial collection, and parallel garbage collection greater complexity still. Garbage collection manages memory in a type-safe manner, but consumes very substantial processor and other system resources.

Another approach to type-safety is the use of "fat" pointers, i.e. pointers which carry with the additional data, including in particular a "capability" which uniquely identifies the allocated memory region. Whenever an area of memory is reused, it is given a new capability. The pointer's capability is checked each time it is used to reference something, and if it does not match the currently allocated capability for the memory address being references, then it is known that the pointer is invalid, and the system can take appropriate action. The capability must be sufficiently large to assure uniqueness. The use of fat pointers also involves substantial overhead, because it increases the size of pointers and requires additional checks when pointers are used to reference data.

Certain programming languages do not use these or substitute constructs for assuring type-safety, and are vulnerable to type violations. For example, the C++ programming language allows the programmer to manage memory. I.e., the programmer manually specifies by code instruction when a data structure can be deallocated and its memory reused for other data. This form of memory management is inherently more efficient and flexible than garbage collection or other forms of type-safety, but it also allows the programmer to leave dangling pointers when deallocating a data structure, which can result in a type violation. Despite this vulnerability, C++ continues to be widely used for the advantages it provides.

Various modifications to C++ have been proposed which incorporate garbage collection or other forms of type-safety, but in general these forfeit many of the advantages of flexibility and efficiency for which C++ is known, and for which it is chosen in a variety of applications. It would be desirable to provide improved type-safety for C++ and similar programming languages, while preserving the language semantics and the advantages that such languages provide.

SUMMARY OF THE INVENTION

A memory management mechanism for a computer program which allocates data structures during execution requires data structures to be explicitly deallocated in the programming code (as in conventional C++ and certain other languages), but deallocation does not immediately make the memory available for reuse (unlike conventional C++). Before a deallocated memory region can be reused, the memory management mechanism scans memory for pointers to the deallocated region, and sets any such pointer to null. The deallocated memory is then available for reuse.

In the preferred embodiment, deallocated memory regions are accumulated, and a memory cleaning process periodically scans memory for pointers to any of the accumulated deallocated regions, nullifying these pointers. Only after all such pointers are nullified does it make the memory available for reuse (freed). The memory cleaning process can be triggered in any of various ways, and in particular can be triggered when the amount of accumulated deallocated but not yet freed memory reaches some threshold.

In the preferred embodiment, the memory cleaning process is an incremental process which runs periodically intermixed with program execution. In order to prevent previously scanned and cleaned memory becoming contaminated with a dangling pointer before the memory cleaning process is finished, any write to a pointer is checked to verify that the applicable target address has not been deallocated. Preferably, a single bit is placed in the memory to indicate validity, and the bit for the applicable target address is checked when writing to a pointer. This check involves some additional overhead, but in general writes to pointers are relatively infrequent events. No check is required to reference a pointer, so long as the pointer itself is not changed. It would alternatively be possible to halt program execution while executing the memory cleaning process.

By cleaning deallocated memory before reuse in accordance with the preferred embodiment, a dangling pointer is effectively prevented from causing an undetected type violation. If a programmer uses a pointer to a deallocated region before the pointer has been nullified, the data in the deallocated region is still there, so no type violation occurs; there is probably a programming error, but one which should be easier to find. If a programmer uses a pointer to a deallocated region after the pointer has been nullified, the system will produce an immediate null pointer exception, which again makes the error much easier to debug. At the same time, consistency is maintained with existing C++ and similar programming language semantics, since the programmer already deallocates memory manually. Furthermore, the overhead required for a cleaning process is relatively small compared with conventional garbage collection.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
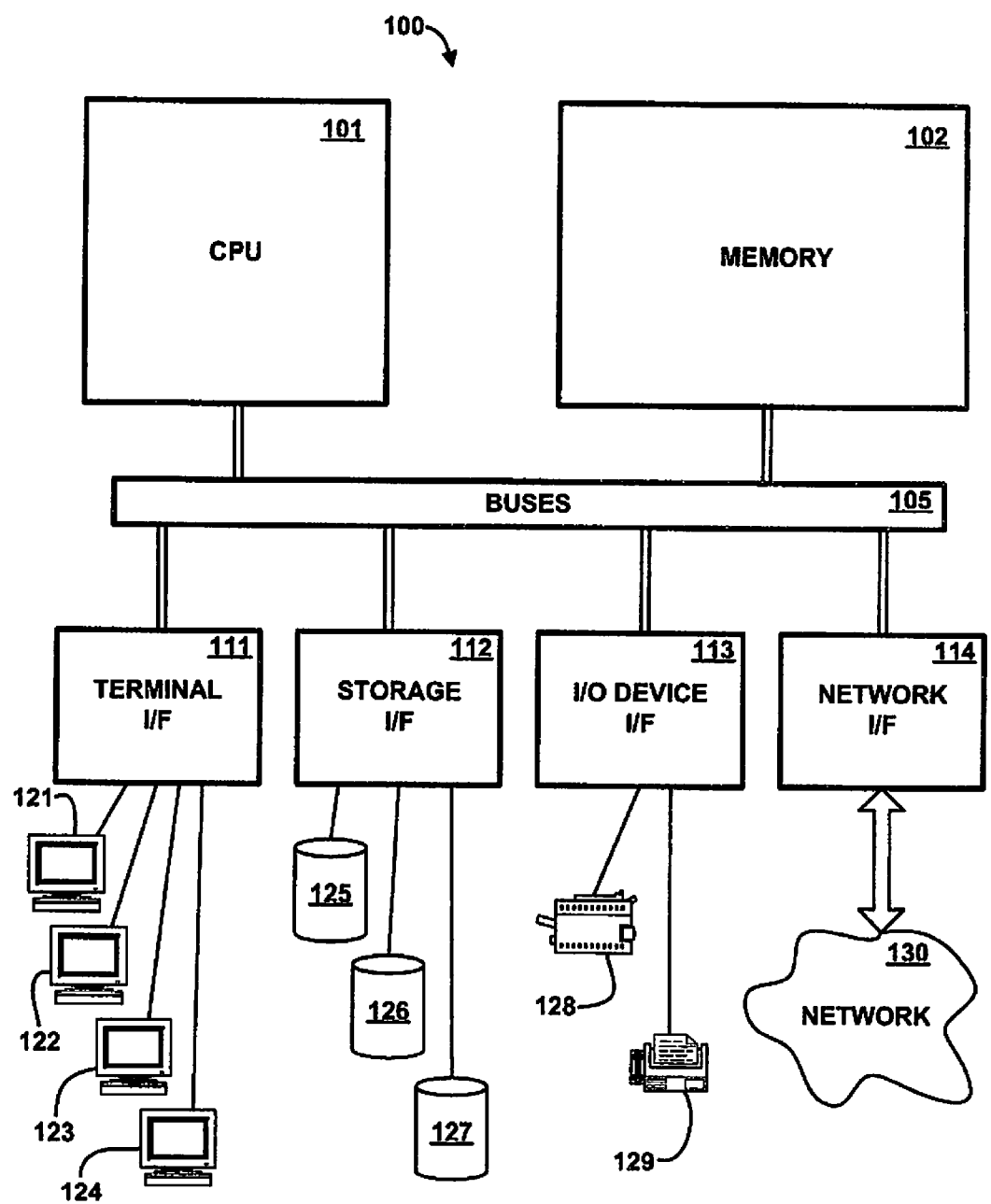
FIG. 1 is a high-level block diagram of the major hardware components of a computer system which automatically cleans deallocated memory for reuse to avoid type violations, according to the preferred embodiment of the present invention.

Referring to the Drawing, wherein like numbers denote like parts throughout the several views, FIG. 1 is a high-level representation of the major hardware components of a computer system 100 which automatically cleans deallocated memory for reuse to avoid type violations, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

A memory bus provides a data communication path for transferring data among CPU 101, main memory 102 and a I/O bus interface unit. I/O bus interface 105 is further coupled to a system I/O bus for transferring data to and from various I/O units, the memory bus, I/O bus interface and system I/O bus being represented collectively in FIG. 1 as feature 105. The I/O bus interface communicates with multiple I/O interface units 111-114, which may also be known as I/O processors (IOPs) or I/O adapters (IOAs), through the system I/O bus. The system I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although a memory bus is shown in FIG. 1 as a relatively simple, single bus structure providing a direct communication path among CPU 101, main memory 102 and an I/O bus interface, in fact a memory bus may comprise multiple different buses or communication paths, which may be arranged in any of various forms, such as point-to-point links in hierarchical, star or web configurations, multiple hierarchical buses, parallel and redundant paths, etc. Furthermore, while an I/O bus interface and I/O bus are shown as a single unit, system 100 may in fact contain multiple I/O bus interface units 105 and/or multiple I/O buses. While multiple I/O interface units are shown which separate a system I/O bus from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
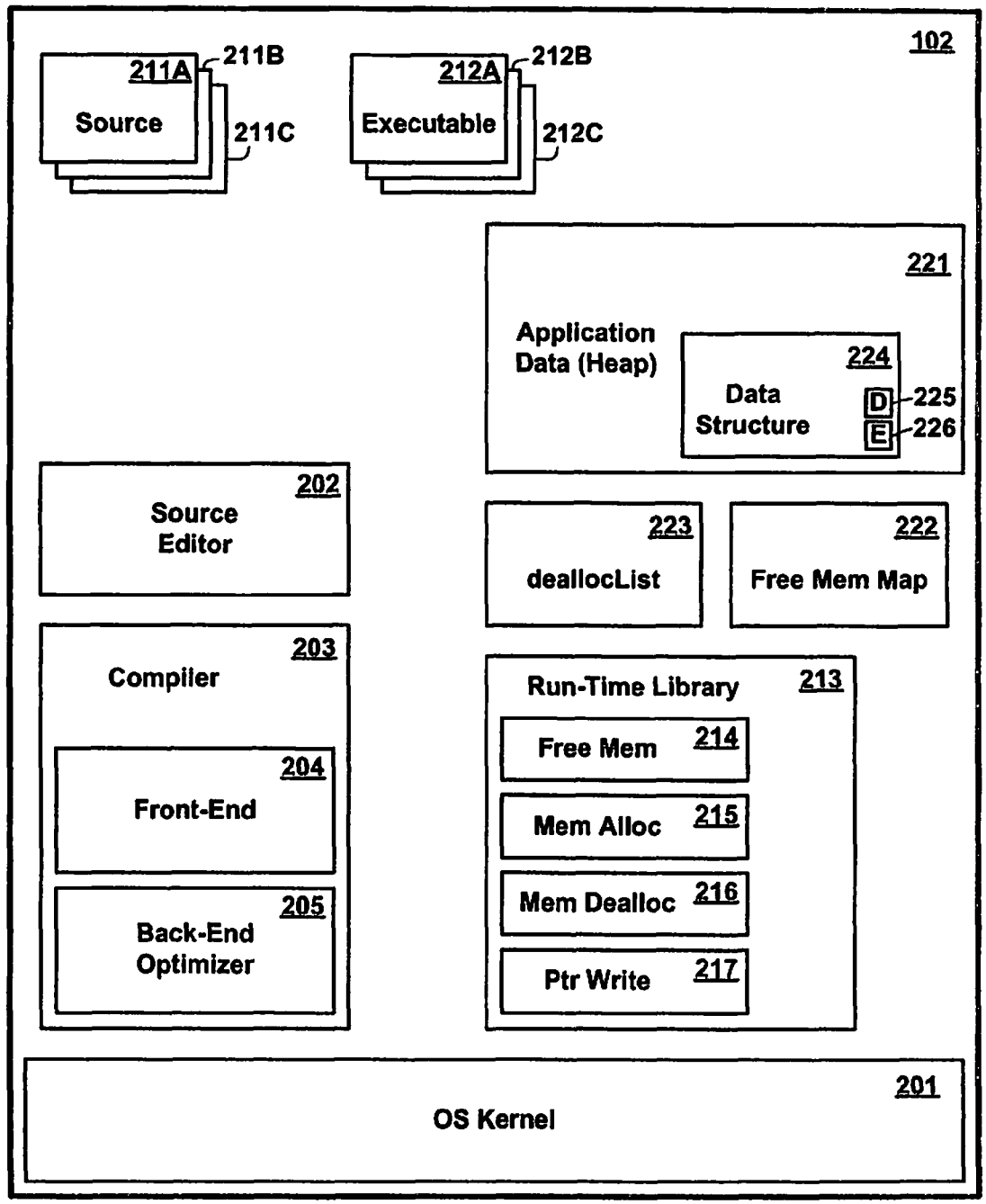
FIG. 2 is a conceptual illustration of the major software components of a computer system which automatically cleans deallocated memory, according to the preferred embodiment.

FIG. 2 is a conceptual illustration of the major software components of system 100 in memory 102. Operating system 201 provides various low-level software functions, such as device interfaces, management of memory pages, management and dispatching of multiple tasks, etc. as is well-known in the art. Various programs comprise a code development environment for supporting the development of computer application programs using a high-level language. The code development environment includes source editor 202 and compiler 203. A complete code development environment may include additional software components (not shown), such as a debugger, build utility, version tracking software, and so forth. In the preferred embodiment, the high-level language is a language which supports allocation and deallocation of data structures from a memory heap, and in which the programmer specifies data structure deallocations in the source code. In particular, it is preferred that the high-level language be the C++ language, it being understood that other languages could alternatively be used.

Source editor 202 is an executable computer program which supports the creation and editing of source code for other computer programs, using any of various known techniques. Source files 211A-211C (herein generically referred to as feature 211) represent files containing source code, which are created and edited using source editor 202. Source editor 202 could be a general-purpose text editor which is non-specific to a programming language and has no diagnostic capabilities, or could be a special-purpose source editor (typically for a particular high-level language) having built-in syntax checking or other diagnostic support features, as are known in the art.

Compiler 203 compiles source files 211 in human readable form to executable code modules 212A-212C (herein generically referred to as feature 212) in the form of instructions executable on a computer processor. Executable code modules 212A-212C are intended to represent modules corresponding to source code modules 211A-211C, i.e., object code module 212A is produced from source module 211A. Compiler 203 includes a front-end compilation section 204, and a back-end compilation section 205. In general, front-end 204 parses the source code to determine the structure of program control flow and the required executable commands. Back-end compilation section 206 generally converts parsed data to executable code, determines register and memory address assignments, and performs certain optimizations. In particular, in accordance with the preferred embodiment of the present invention, front-end 204 converts any source code statement which purports to deallocate or free a data structure for reuse into a call to a memory deallocation routine 216 in run-time library 213, as described in greater detail herein.

Although not depicted in FIG. 2, in some development environments a front-end compiler produces code in an intermediate representation, between source code and executable code. Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware. The present invention is applicable to development environments employing an intermediate code representation, as well as those which do not. In general, where a front-end compiler compiles code to memory deallocation routine 216.

Run-time library 213 includes various commonly used routines to support features of the high-level language. In particular, in accordance with the preferred embodiment, among the routines included in run-time library 213 are free memory routine 214, memory allocation routine 215, and memory deallocation routine 216, and pointer write check routine 217. Memory allocation routine 215 is used to allocate a data structure from free memory in the run-time heap of the application program, responsive to an allocation instruction in the program source code. Memory deallocation routine 216 is used to deallocate a previously allocated data structure in the run-time heap responsive to a deallocation instruction in the program source code. Pointer write check routine 217 is used to verify that a value being written to a pointer does not reference a deallocated address, responsive to an instruction in the program source code which causes a value to be written to a pointer. As used herein, "responsive to an instruction in the program source code" means that the compiler causes the corresponding run-time library routine to be called (or inserts the run-time library code in-line) in the executable code that is produced from a source code allocation or deallocation statement, so that the use of these routines is effectively under the direct control of the programmer. Free memory routine 214 is an incremental routine which executes at run-time to clean up memory for re-use. Each call to the free memory routine runs one incremental step of the routine, rather than running the routine from beginning to end. Free memory routine 214 is not explicitly invoked by the programmer in any source code statement. The operation of these run-time library routines is described in greater detail herein.

In addition to certain software entities used in a development environment, FIG. 2 depicts certain run-time software entities, specifically application data heap 221, heap free memory map 222, and list of deallocated data ("deallocList") 223. Application data heap 221 contains application data structures 224 which are allocated by the application program during execution to hold data being processed by the application program, as is well known in the art. For clarity of illustration, only one application data structure 224 is shown in FIG. 2, it being understood that during execution the number of such structures is typically much larger. Each data structure 224 contains a deallocated bit or flag ("deallocFlag") 225 in its header, indicating whether the corresponding data structure has been deallocated, and an epoch flag 226; use of such bits is described in greater detail herein. A data structure may contain an arbitrary number and mixture of data fields; although a data structure may be quite complex, the use of the term "data structure" is not meant to imply any particular degree of complexity, and a data structure may in fact contain only a single scalar variable. Heap free memory map 222 is a data structure which records data allocations from the heap, and is used by memory allocation routine 215 to allocate new data structures. I.e., when memory allocation routine is invoked to allocate a new data structure from the heap, it checks the memory map to find a sufficiently large free region of memory in the heap to satisfy the allocation, as is known in the art. Free memory map 222 may assume any form now known or hereafter developed for recording data allocations from the heap and free memory areas available for re-use. Although shown as a single entity, free memory map 222 may be constructed as multiple entities, and may include arrays, linked lists, tables, or any of various structures. List of deallocated data 223 records data structures which have been deallocated by memory deallocation routine 216 (i.e., responsive to an explicit statement by the programmer in the source code to deallocate a data structure), but have not yet been freed and made available for re-use by memory allocation routine 215. List of deallocated data 223 is described in greater detail herein.

FIG. 2 conceptually represents entities which are part of a development environment for editing and compiling computer programming code, and which are part of a run-time environment for executing a previously developed computer program. While it is possible that both the development environment and the run-time environment will exist on the same computer system, in general computer programs are developed on one system and executed on another system, as is well known in the art. The conceptual representation of FIG. 2 is not intended to limit the present invention to use on any particular number of systems. In addition to the various development environment and run-time environment entities represented in FIG. 2, system 100 may include any of various other applications (not shown) or other software entities.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex code development environment or application run-time environment, the number and complexity of such entities is typically much larger. Additionally, although software components 202-205, 211-217 and 221-223 are depicted in FIG. 2 on a single computer system 100 for completeness of the representation, it is not necessarily true that all programs, functions and data will be present on a single computer system or will be performed on a single computer system.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
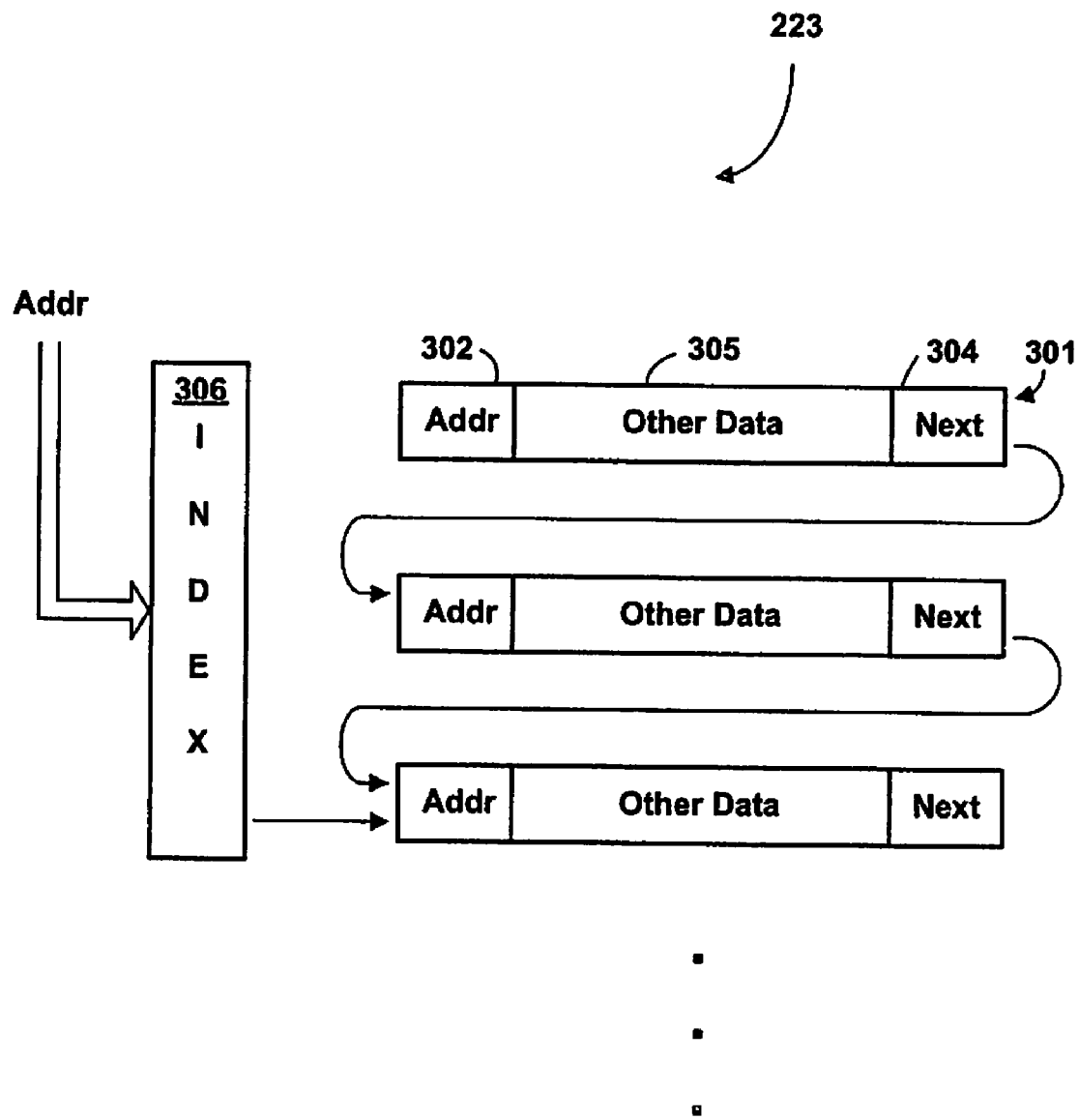
FIG. 3 is a conceptual representation of a data structure containing a listing of deallocated data structures, according to the preferred embodiment.

FIG. 3 is a conceptual representation of a list of deallocated data 223, according to the preferred embodiment. List of deallocated data 223 is a data structure containing a listing of all data structures in the heap which have been explicitly deallocated during program execution (responsive to one or more deallocate statements in the programming code), but have not yet been freed for re-use by newly allocated data structures. Although represented in FIGS. 2 and 3 as a separate entity, list of deallocated data 223 could be contained within a larger data structure, such as free memory map 222. I.e, the data required to be recorded in deallocated data list 223 could be contained in a larger data structure, which is organized so that the list of deallocated data 223 can be easily extracted from the larger data structure.

As shown in FIG. 3, list of deallocated data 223 may be formed as a linked list of entries 301, each entry corresponding to a single deallocated data structure. Each entry preferably contains one or more fields specifying the address range 302 of the deallocated data structure (such as a starting address and ending address, or a starting address and length); and a next entry pointer 304 pointing to the next entry on the linked list. Each entry may optionally contain other data 305 useful in identifying the deallocated data structure or its properties, such as a pointer to a control block or header block for the deallocated data structure, state data, etc.

List of deallocated data 223 is preferably sorted by address and may optionally include an indexing mechanism 306 for more directly accessing a list entry corresponding to a give input address, without traversing each list element until the desired location is found. Indexing mechanism could be, e.g. a binary tree index, an array corresponding to different address ranges, or some other form of index. Such a structure could be used, e.g., for determining whether a given input address is within a deallocated data structure.

Although represented in FIGS. 2 and 3 as a separate entity, list of deallocated data 223 could be contained within a larger data structure, such as the headers 224 of the data structures themselves, or free memory map 222. For example, each header could contain the flag 225 indicating whether the corresponding data structure had been deallocated, as well as the other fields 302, 304 shown in FIG. 3. It would then be possible to traverse the list of deallocated data structures by following the pointers in the headers.

In accordance with the preferred embodiment of the present invention, allocated data structures on the heap are explicitly deallocated by the programmer (i.e., by deallocation statements in the source code), but deallocation does not immediately make the memory available for reuse. A deallocated structure is placed on the list of deallocated data structures 223. At some later time, an incremental free memory process scans memory for pointers to any of the deallocated data structures, and sets any such pointer to null. The deallocated memory is then available for reuse, and is added to the record of free memory.

During the period that the data structure is on the deallocated list, it is not possible to re-allocate its memory space, and the data structure can still be accessed by a dangling pointer. Such an access will not produce a type error, since the data remains intact. The very fact of the access indicates a logic error in the program, but such an error should be much easier to identify and correct.

Any time a pointer is written, the pointer address is checked to determine whether the corresponding address has been deallocated. If so, a null value is written instead. Any subsequent attempted use of the pointer will produce a null pointer error, but will not produce a type error by accidentally referencing a deleted region of memory. Again, the very fact that a pointer is being written with a deallocated address indicates a program logic error, but by writing a null pointer value, the error is much easier to identify and correct than would be a type error resulting from an erroneous pointer value. The verification of pointer value on writes introduces some overhead to the heap management technique of the preferred embodiment, but in typical applications, pointer writes are relatively rare in comparison to ordinary references using a pointer. In accordance with the preferred embodiment, neither reading pointers nor dereferencing pointers (accessing the data pointed to) requires any special checks. Note that in C/C++, reading and writing a dangling pointer is not an error, only dereferencing the pointer is. Hence, the write-barrier never throws an error.

Figure 4:
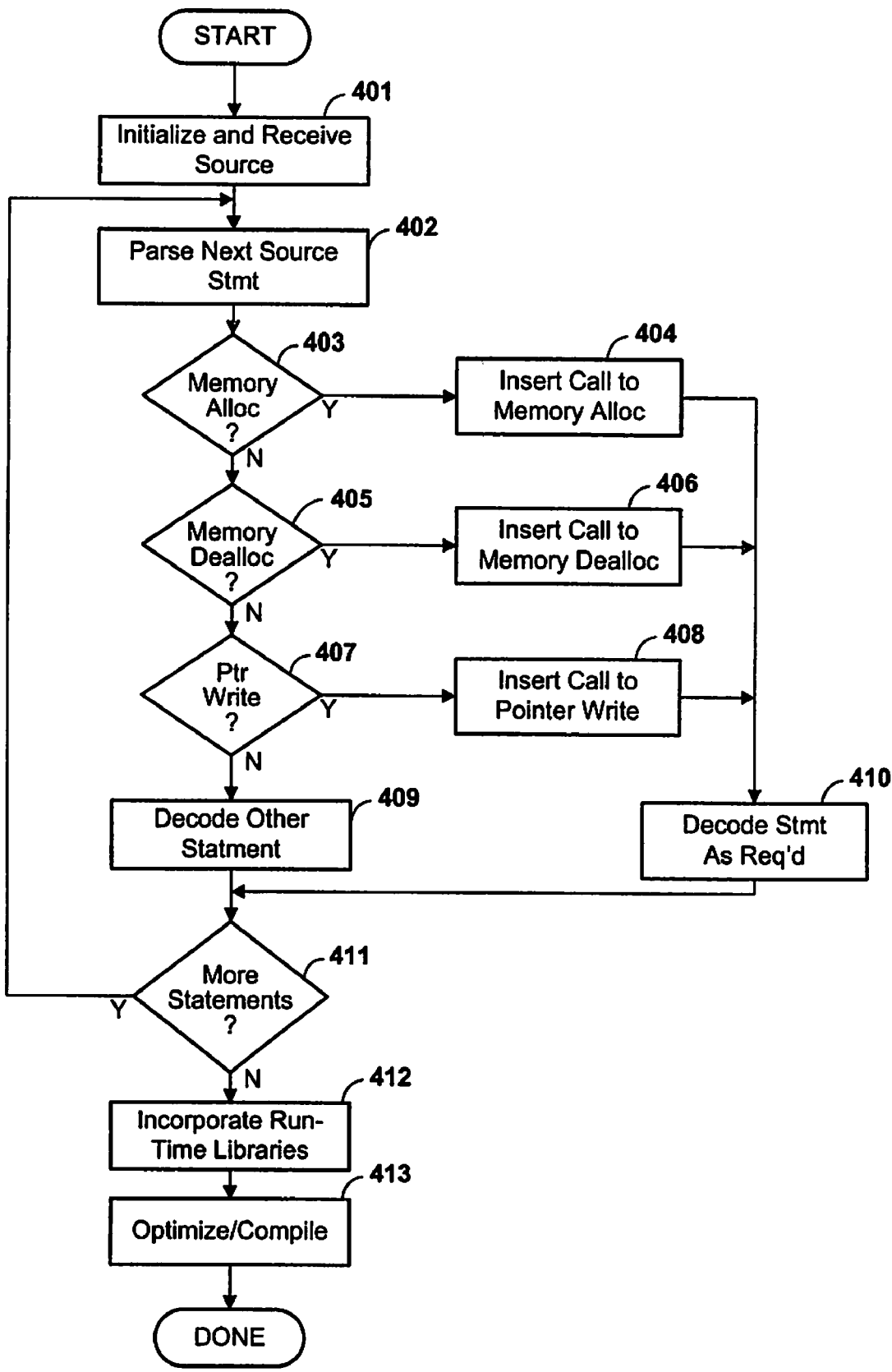
FIG. 4 is a high-level flow diagram of the process of compiling source code in a high level language to implement a system which automatically cleans deallocated memory for reuse, according to the preferred embodiment.

In the preferred embodiment, compiler 203 compiles a program to implement the heap management technique disclosed herein by referencing appropriate run-time library modules whenever corresponding statements are encountered in the source code, and by incorporating the run-time library free memory routine for execution with the computer programming code written by the programmer. FIG. 4 is a high-level flow diagram of the compilation process.

Referring to FIG. 4, upon invoking the compiler, compiler 203 initializes and receives the source file 211 to be compiled (step 401). Compiler 203 successively examines and parses each source statement to determine an appropriate decoding (step 402). If the source statement is or contains a memory allocation, the 'Y' branch from step 403 is taken, and the compiler inserts a call to memory allocation run-time routine 215 in the code (step 404). If the source statement is or contains a memory deallocation, the 'Y' branch is taken from step 405, and the compiler inserts a call to memory deallocation run-time routine 216 in the code (step 406). If the source statement is or contains a write to a pointer (changes the value of a pointer), the 'Y' branch is taken from step 407 and the compiler inserts a call to pointer write check run-time routine 217 (step 408). Depending on the constraints of the language, it may not be necessary to call the pointer write check every time a pointer could be altered. For example, if a new data structure is allocated and a pointer is set to its address, it may be unnecessary to check the address, since memory allocate routine will presumably provide a correct address. Another example would be a source code statement which sets a pointer to a fixed value of null. There could be other such statements. But if a pointer is simply copied to the heap from another pointer variable, then the new value should be checked. Any required additional code to implement the source statement is inserted (step 410). If the parsed statement is neither a memory allocation, a memory deallocation, nor a pointer write, then the statement is decoded and appropriate implementing code is inserted (step 409).

If any more statements remain to be parsed, the 'Y' branch is taken from step 411 and a next source statement is parsed at step 402. When all statements in the source have been processed, the 'N' branch is taken from step 411. The compiler incorporates the required run-time library routines, including in particular free memory routine 214, memory allocation routine 215, memory deallocation routine 216, and pointer write check routine 217 (step 412). "Incorporation" can be performed in any manner known in the compilation and build art, and is typically in the form of a reference or references to the run-time library routines (which are normally compiled separately), although it could alternatively be by actual incorporation of run-time routine source code and compiling with the programmer supplied source code. The compiler (typically the back-end portion) then compiles and, if necessary, optimizes, the decoded source to produce executable code (step 413).

Although a compiler has been described at a high level of abstraction, in which calls to various run-time library routines are inserted into the executable code to perform the functions described herein, it will be understood by those skilled in the art that, in general, a compiler, build utility or other mechanism or combination thereof may produce a computer program by any of various alternative equivalent mechanisms, such as in-lining certain code (which may be from a library, or may be hard-coded in the compiler itself), inserting calls to external, previously compiled procedures which are linked by a build utility or similar mechanism, etc.

A program compiled as described above causes certain run-time routines to be called during execution where memory is allocated, deallocated, or pointers are updated responsive to corresponding statements in the source code. Additionally, free memory routine 214 is invoked from time to time without the programmer explicitly requesting it. The operation of these various routines during program execution is described below.

Figure 5:
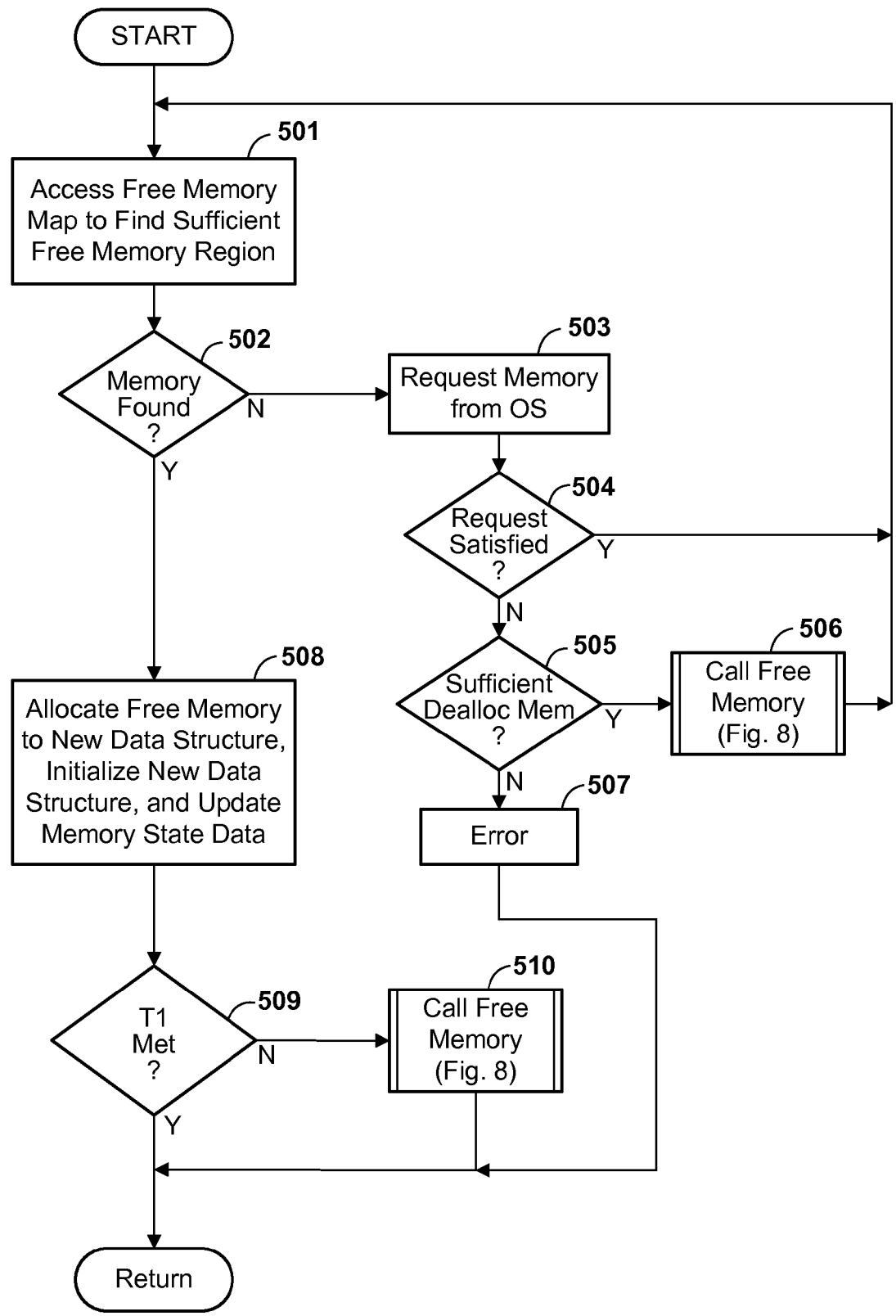
FIG. 5 is a flow diagram showing the process performed by a memory allocate routine for allocating memory to a data structure, according to the preferred embodiment.

When the programmer has specified in a source code statement that some data structure be allocated from the heap, memory allocate routine 215 is called. FIG. 5 is a flow diagram showing the process performed by memory allocate routine 215 when called.

Referring to FIG. 5, upon being invoked, allocate memory routine accesses free memory map 222 to find a sufficiently large region of free memory to satisfy the memory allocation request (step 501). If such a region is not found, the 'N' branch is taken from step 502. In this case, the allocate memory routine will first request additional memory from the operating system (step 503). If the request for additional memory is granted, (the 'Y' branch from step 504), the application returns to step 501. If the request for additional memory is not granted (the 'N' branch from step 504), the allocate memory routine checks for sufficient deallocated (but not yet freed) memory. If sufficient deallocated memory exists (the 'Y' branch from step 505), then the free memory routine is called (step 506) to attempt to enlarge free memory and thus satisfy the request. On return from the call to the free memory routine at step 506, allocate memory again accesses the free memory map to attempt to find a sufficiently large region of free memory (step 501). If, at step 505, insufficient deallocated memory exists, then the 'N' branch is taken from step 505. In this case, it is not possible to satisfy the memory allocation request, and the memory allocation routine generates an error (step 507) and returns. The error will then be handled appropriately; generally, such an error will cause termination of program execution.

If, at step 502, sufficient memory was found to satisfy the memory allocation request, the 'Y' branch is taken from step 502. The memory allocation routine then allocates a portion of free memory to the new data structure specified when calling the memory allocation routine (step 508). Memory allocation routine performs any required steps to allocate memory to a new data structure, and in particular initializes the new data structure (including initializing the epochFlag to the current epoch, the deallocFlag to 'false', and any pointers to null), and updates free memory map 222 and any other state data recording the state allocated data structures so that the allocated memory is no longer available for further allocation.

If, after the memory allocation, some threshold T1 representing the available free memory is no longer met, the 'N' branch is taken from step 509, and the free memory routine is called to increase the available free memory for possible future allocations (step 510). Threshold T1 could be a fixed constant of free memory, or a fixed constant of deallocated memory, but is more preferably expressed as some variable value which is adjustable to the execution environment. In particular, it is preferred that T1 be a ratio of the amount of memory allocated to the amount deallocated (but not yet freed for reuse). For example, when the ratio of allocated to deallocated is less than or equal to 8, then free memory routing might be triggered. Such a threshold balances the amount of memory overhead with the amount of work to free memory. Threshold T1 could alternatively be based on other environmental variables, such as a percentage of heap size allocated. The memory allocate routine then returns.

Figure 6:
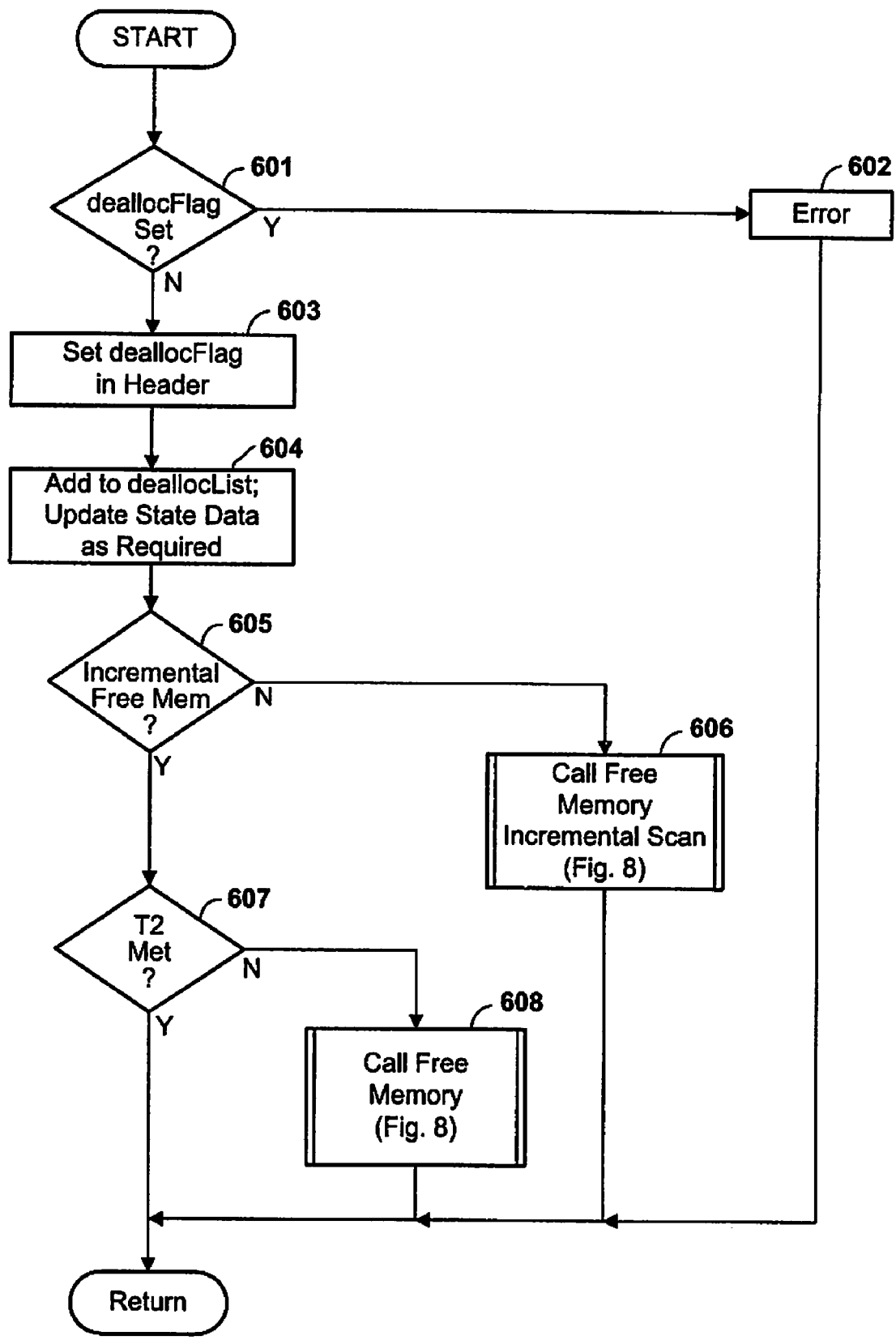
FIG. 6 is a flow diagram showing the process performed by a memory deallocate routine for deallocating a data structure, according to the preferred embodiment.

When the programmer has specified in a source code statement that some data structure be deallocated, memory deallocate routine 216 is called. FIG. 6 is a flow diagram showing the process performed by memory deallocate routine 216 when called.

Referring to FIG. 6, upon being invoked to deallocate a specified data structure, memory deallocate routine 216 checks the state of deallocate flag 225 in the header 224 of the data structure to be deallocated. If the deallocate flag is already set, an error condition is indicated, since the program should not be attempting to deallocate a data structure which has already been deallocated. In this case, the 'Y' branch is taken from step 601, an appropriate error message is generated (step 602), and the memory deallocate routine returns. Such an error may cause termination of program execution.

If the deallocate flag 225 of the data structure to be deallocated is not set (the 'N' branch from step 601), the memory deallocate routine sets the deallocate flag to prevent a pointer update to a value pointing to an address in the deallocated region (step 603). Any appropriate memory state data structures are then updated, and in particular, the deallocated data structure or a reference to it is added to deallocate list 223, and the total amount of deallocated memory is incremented (step 604). If a scan of heap memory by free memory routine 214 is in progress, some deallocated data structures must be scanned for pointers to other deallocated data structures. The epoch flag is used to determine if this is necessary, as will be described in conjunction with the free memory routine. If the deallocated data structure needs to be scanned, it can be scanned immediately as part of the deallocation routine itself, or put on a special list to be scanned by the free memory routine.

If an instance of free memory routine is currently in progress incrementally, then the 'Y' branch is taken from step 605, and free memory is called to perform one additional incremental scan of a pre-determined number of data structures or other entities (step 606). An incremental scan means that, each time the free memory routine is invoked, it scans a pre-determined number of data structures, or locations or pointers within data structures, beginning at the point it previously left off, and so after being invoked a number of times completes a scan of all applicable data structures. (see discussion of FIG. 8, below).

If, after the memory deallocation, some threshold T2 representing the available free memory is no longer met, the 'N' branch is taken from step 607, and the free memory routine is called to increase the available free memory for possible future allocations (step 608). I.e., at step 608, the free memory routine is called from its starting point to perform initialization of a scan of all data structures (as opposed to an incremental scan as in step 606). The deallocate routine then returns. Threshold T2 is preferably a ratio of the amount of memory allocated to the amount deallocated (but not yet freed for reuse), as in the case of threshold T1, but could alternatively be any of the other formulations discussed above with reference to threshold T1. Threshold T2 could be identical to threshold T1, although it need not be.

Figure 7:
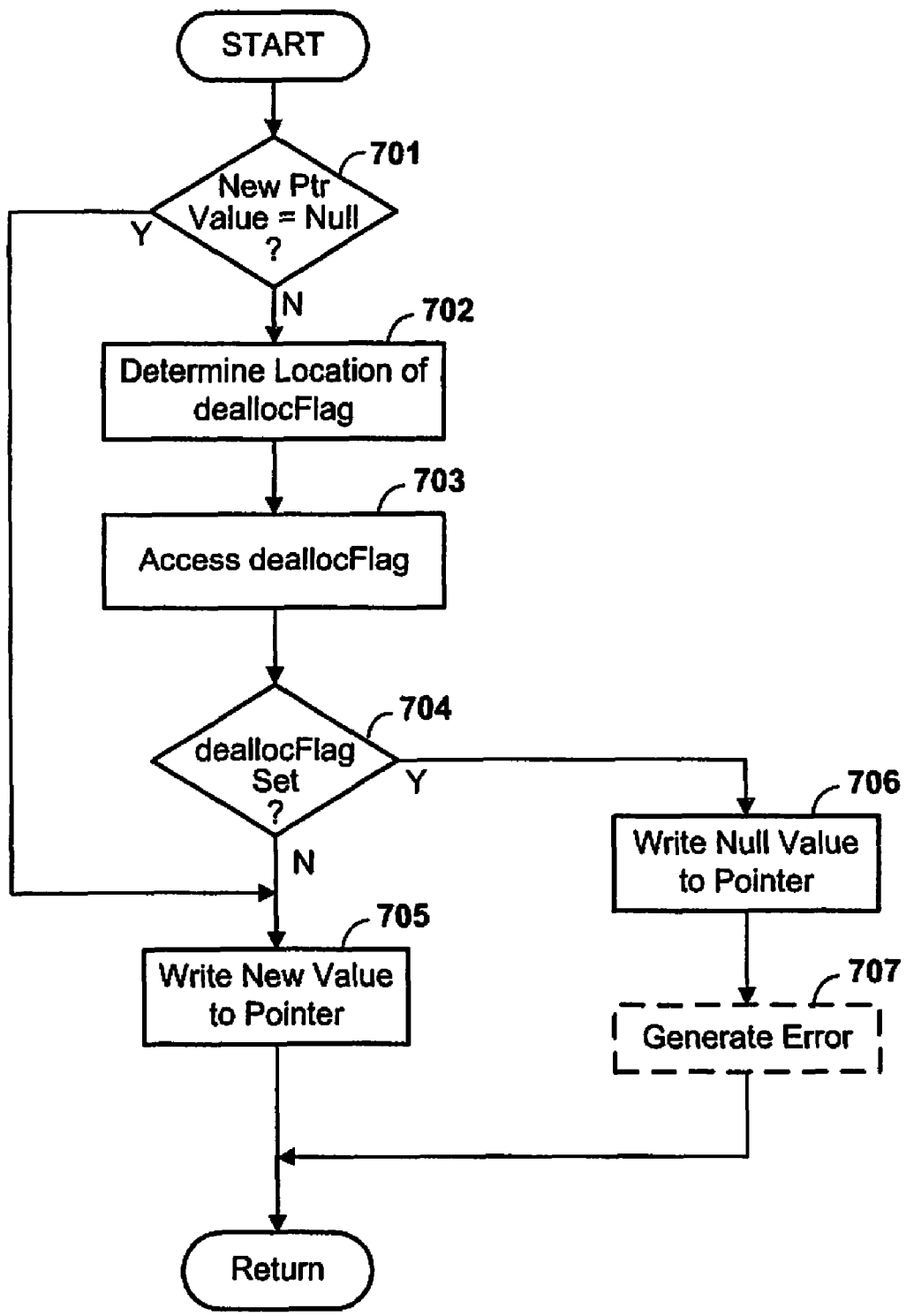
FIG. 7 is a flow diagram showing the process performed by a pointer write check routine for checking the value to be assigned to a pointer, according to the preferred embodiment.

When the programmer has specified in a source code statement that a value of a pointer be altered, pointer write check routine 217 is called. FIG. 7 is a flow diagram showing the process performed by pointer write check routine 217 when called.

Referring to FIG. 7, upon being invoked to check an address value to be assigned to a pointer, pointer write check routine 217 first checks whether the new pointer value to be written is a null value (step 701). If so, then any further verification is unnecessary; the 'Y' branch is taken from step 701, and the new value is written to the pointer at step 705. If the new pointer value is non-null, the 'N' branch is taken from step 701. The pointer write check routine then determines the location of the deallocate flag 225 for the applicable data structure 224, i.e. the data structure containing the address pointed to by the pointer (step 702). If it is known that the pointer points to the beginning of the data structure, then the deallocate flag location is a known offset from the pointed-to address. But it can not be assumed in the general case that this will be known. There are various techniques by which the deallocate flag location can be determined, and any such technique, now known or hereafter developed, could be used. For example, there are various techniques for embedding the necessary information in the pointer itself. A pointer could contain a size and offset of the data structure being referenced, from which it is possible to extract the beginning of the data structure (and hence the location of the deallocate flag within the data structure). A pointer could alternatively be a "fat" pointer, containing the pointer itself and a pointer (or offset) to the header. Alternatively, the heap can be organized according to the size of the allocated data structures, so that structures of a particular size are grouped together in the address space and segregated from structures of different size. Relatively small data structures would be allocated on known boundaries, so that the beginning of a data structure can be inferred from the pointer address. For some small structures, it is alternatively possible that the deallocate flag be stored in a separate array of such flags, the array location being inferred from the location of the data structure. Other techniques may be possible. Generally, it is desirable to provide a fast mechanism for checking the pointer to avoid undue overhead of the memory management mechanism; however, it may alternatively be possible to access the list of deallocated data structures (e.g., using index 306) to determine whether an arbitrary pointer points to a location in a deallocated structure.

The deallocate flag 225 is then accessed (step 703). If the deallocate flag is not set, indicating that the corresponding data structure has not been deallocated, then the 'N' branch is taken from step 704, and the new address value is written to the pointer location in memory (step 705). The write check routine then returns.

If, on the other hand, the deallocate flag accessed at step 703 is set, then the 'Y' branch is taken from step 704. In this case, a null value is written to the pointer location, instead of the value specified by the programmer (step 706). The null value will prevent any future attempt to use the pointer to access deallocated data, and will prevent further propagation of a pointer to the deallocated data by copying the pointer being updated. In some environments (although not in C++), the pointer write check routine may optionally generate an error message, represented as step 707. The generation of an error message is optional, because by writing a null value to the pointer, any further attempted use of the pointer will cause an error to be generated anyway. In ether case, a potential type violation is prevented, and the error message produced will alert the programmer to the nature of the program logic error.

During execution, repeated deallocations will cause deallocated data structures to accumulate. Free memory routine is invoked from time to time to clean up memory so that the memory space occupied by the deallocated data structures can be reused. Specifically, free memory routine nullifies any outstanding pointers to addresses in the deallocated data structures, so that it will not be possible to accidentally access such an address on the assumption that the data type is that of the deallocated data structure (a potential type violation). After nullifying all such pointers, it is safe to reuse the memory space.

Figure 8:
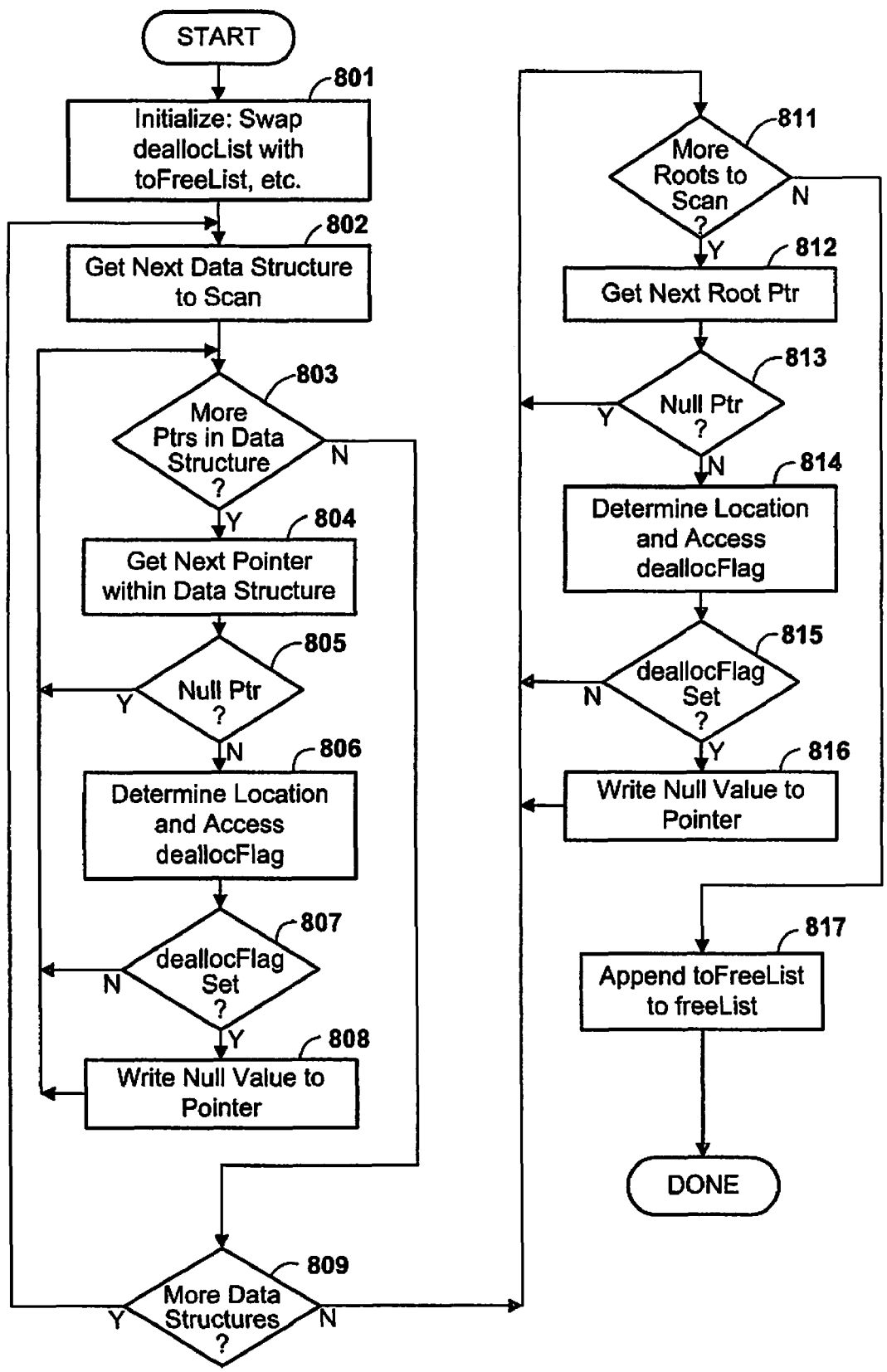
FIG. 8 is a flow diagram showing the process performed by a free memory routine for cleaning previously deallocated memory for reuse, according to the preferred embodiment.

In the preferred embodiment, free memory routine is invoked from time to time when the ratio of allocated memory to deallocated but not freed memory becomes too small, as explained above. However, it would alternatively be possible to invoke the free memory routine responsive to other triggering events. For example, free memory routine could be invoked whenever some cycle count is reached, or using combinations of the above criteria and/or others. As a further alternative, it would be possible to clean memory as described below immediately upon deallocating a data structure without accumulating multiple deallocated data structures for freeing. Free memory routine 214 can run either serially (i.e., by stopping the application), incrementally (i.e. by temporarily halting the application to perform some number of steps of free memory), or in parallel (as an asynchronous thread). In the preferred embodiment, free memory routine generally runs incrementally, and when invoked it scans some pre-determined number of data structures or other entities (i.e., step 802 below is performed some pre-determined number of times) before halting and allowing the application to resume. However, if free memory routine is invoked because memory is insufficient to satisfy an allocation (step 506), then the free memory routine should execute until finished. FIG. 8 is a flow diagram showing the process performed by free memory routine 214.

Referring to FIG. 8, free memory routine 214 initializes various data structures for tracking state while scanning data structures in memory (step 801). In particular, free memory routine generates or obtains a list of data structures to be scanned, and a list of previously deallocated data structures which will be freed for reuse by the free memory routine. Since free memory routine of the preferred embodiment is an incremental process, data structures can be deallocated during a scan. Data structures deallocated during a scan are not freed, as there is no guarantee that all pointers to them have been nullified. Preferably, deallocated data list 223 is swapped with an empty list of data structures to be freed ("toFreeList") upon initializing the free memory routine, and the latter is thereafter used by the free memory routine. Any subsequent deallocations occurring while the free memory routine is in progress will be added to deallocated data list 223, without affecting toFreeList. A list of data structures to be scanned can be obtained from the list of allocated data structures (either by swapping or copying), and a mechanism exists so that any subsequently deallocated data structure remains on the list at least until it is scanned by free memory routine as described herein. The free memory routine also resets the deallocated memory counter to zero.

In the preferred embodiment, data structures deallocated after the start of a scan are not freed at the end of the scan. Data structures allocated after the start of a scan do not need to be scanned, and preferably are not. For this reason, a "toScanList" and a "toFreeList" are created at the start of the scan process. The epochFlag is used to record whether a data structure was allocated before or after the start of a scan, and hence whether a data structure being deallocated is on the toScanList, and should be scanned at some point, or is on the allocated list, and can be immediately placed on the deallocated list without being scanned. Time is divided into epochs, and the epoch changes at the start of a scan. When a data structures is allocated, its epochFlag is set to the epoch at the time of allocation. During deallocation, the epochFlag is compared to the current epoch. If they are the same, then the data structure was allocated during the current epoch after the start of the current scan, is therefore on the allocated list, and does not need to be scanned. If the epochFlag of the deallocated data structure does not match the current epoch, then the data structure was allocated in a previous epoch before the start of the current scan, is on the toScanList, and does need to be scanned. As data structures are scanned, their epochFlags are updated to the current epoch so they are not scanned again if deallocated.

The free memory routine then scans data structures in heap memory to find and clear any pointers to the deallocated data structures, shown as steps 802-809. Preferably, this is accomplished by retrieving each data structure in turn from the list of data structures to be scanned ("toScanList"), accessing each pointer in the data structure, and determining whether it references deallocated memory. The locations of pointers within each data structure are known from the type of data structure. However, there could be other means for identifying pointers. For example, memory could be scanned from beginning to end, and pointers identified by tag bits; or pointers could be stored in certain reserved locations of memory.

As shown in FIG. 8, a next data structure to be scanned is retrieved from the list of data structures to be scanned (step 802). The location of pointers within the data structure is determined by the data structure's type. If there are any (more) pointers to be scanned in the data structure, the 'Y' branch is taken from step 803. The free memory routine then retrieves the pointer from its pre-determined location within the data structure (step 804).

If the retrieved pointer is null, then no further verification of the pointer need be performed. In this case, the 'Y' branch is taken from step 805, and a next pointer, if there is one, is selected at steps 803 and 804.

If the retrieved pointer is non-null, the 'N' branch is taken from step 805. The free memory routine then accesses the deallocate flag of the pointed-to data structure to determine whether the pointer points to a location in a deallocated memory structure (step 806). This may be accomplished using any of the techniques described above with respect to steps 701 and 702 used by pointer write check routine. If the pointer points to a location in a deallocated memory structure (deallocate flag is set), the 'Y' branch is taken from step 807, and the pointer is set to a null value (step 808). If the pointer points to a location which is not in a deallocated memory structure, the 'N' branch is taken from step 807, and step 808 is skipped. In either case, the free memory routine then continues the scan at step 803.

Scanning and resetting pointers within the selected data structure continues until all pointers in the data structure have been retrieved and examined, at which point the 'N' branch is taken from step 803. If there are any more data structures to be scanned, the 'Y' branch is then taken from step 809, and a next data structure is retrieved from the list of data structures to be scanned at step 802. When all data structures have been thus scanned, the 'N' branch is taken from step 809.

The free memory routine then follows a similar procedure to scan all root pointers, shown as steps 811-816 (analogous to steps 803-808). Root pointers are pointers in local and global variables, which are not allocated from the heap. The locations of such pointers will either be fixed at compile time, or will be known offsets from called procedure blocks on the stack. Any suitable method, such as have been developed for garbage collection, may be used for traversing all the root pointers.

Referring again to FIG. 8, if any more roots remain to be scanned, the 'Y' branch is taken from step 811. The free memory routine then retrieves the next root pointer (step 804). If the retrieved root pointer is null, then no further verification of the pointer need be performed. In this case, the 'Y' branch is taken from step 813, and a next pointer, if there is one, is selected at steps 811 and 812.

If the retrieved root pointer is non-null, the 'N' branch is taken from step 813. The free memory routine then accesses the deallocate flag of the pointed-to data structure to determine whether the pointer points to a location in a deallocated memory structure (step 814), using any of the techniques described above. If the pointer points to a location in a deallocated memory structure, the 'Y' branch is taken from step 815, and the pointer is set to a null value (step 816). If the pointer points to a location which is not in a deallocated memory structure, the 'N' branch is taken from step 815, and step 816 is skipped. In either case, the free memory routine then continues the scan the roots at step 811

When all root pointers have been thus examined the 'N' branch is taken from step 811. This means that all pointers have been scanned and any pointers to memory on the toFreeList have been reset to null. It is therefore safe to free the heap data structures on the toFreeList for reuse. Free memory routine therefore makes these memory regions available e.g., by appending the toFreeList data structures to a list of data structures which have been freed and are available for reuse (step 817). Depending on the operating system, other data structures, such as a memory map, may also be updated to reflect the newly available free memory.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media are illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims.

What is claimed is:

1. A method for executing a computer program on a computer system, said program having a memory space, comprising the computer-executed steps of:
    allocating a plurality of memory regions for use by respective data structures used in execution of said computer program;
    deallocating at least one said data structure responsive to at least one instruction in the programming code of said computer program, said deallocating step not immediately freeing any memory region allocated to said at least one said data structure for reuse by said computer program;
    automatically scanning said memory space of said computer program to detect any occurrences of pointers to locations within said at least one data structure deallocated by said deallocating step, said automatically scanning step being performed after said deallocating step, and, with respect to any detected said pointers to locations within said at least one data structure deallocated by said deallocating step, changing each said pointer to a null value; and
    automatically freeing at least one said memory region allocated to a said data structure deallocated by said deallocating step for reuse by said computer program, said automatically freeing step being performed after said changing each said pointer detected by said automatically scanning step to a null value, said automatically freeing step being performed separately from and after said deallocating step.

2. The method for executing a computer program of claim 1, wherein said automatically scanning step and said automatically freeing step are performed periodically, each instance of said automatically scanning step and said automatically freeing step being performed with respect to one or more said memory regions deallocated by respective instances of said deallocating step, wherein, for at least some instances of said automatically scanning step and said automatically freeing step, the automatically scanning step instance automatically scans said memory space to detect any occurrences of pointers to any of a plurality of regions deallocated by a respective instance of a plurality of instances of said deallocation step, and the automatically freeing step automatically frees said plurality of regions.

3. The method for executing a computer program of claim 2, further comprising the step of:
    monitoring memory regions deallocated by said deallocating step to determine whether an amount of deallocated memory exceeds a pre-determined threshold;
    wherein said automatically scanning step is performed responsive to determining that an amount of deallocated memory exceeds said pre-determined threshold.

4. The method for executing a computer program of claim 2, further comprising the step of:
    monitoring free memory available for allocation to data structures used in execution of said computer program to determine whether an amount of said free memory is less than a pre-determined threshold;
    wherein said automatically scanning step is performed responsive to determining that an amount of said free memory is less than said pre-determined threshold.

5. The method for executing a computer program of claim 2, further comprising the step of:
    monitoring memory regions allocated by said allocating step and memory regions deallocated by said deallocating step during execution of said computer program to determine whether a ratio of allocated memory to deallocated memory is less than a pre-determined threshold;
    wherein said automatically scanning step is performed responsive to determining that a ratio of allocated memory to deallocated memory is less than said pre-determined threshold.

6. The method for executing a computer program of claim 1, wherein said automatically scanning step is performed incrementally by temporarily halting execution of said computer program a plurality of times and performing a respective portion of said scanning step each time the execution of said computer program is temporarily halted.

7. The method for executing a computer program of claim 1, further comprising the step of:
    preventing writing a value to a pointer variable during execution of said computer program if the value points to a location in a deallocated memory region.

8. The method for executing a computer program of claim 7, wherein said step of preventing writing a value to a pointer variable during execution of said computer program if the value points to a location in a deallocated memory region comprises the steps of:
    responsive to each direction to write a respective value to a corresponding pointer, determining at execution time whether the respective value to be written to the corresponding pointer points to a deallocated memory region; and
    responsive to determining that the value to be written to the corresponding pointer points to a deallocated memory region, writing a null value to the corresponding pointer.

9. A computer program product which re-uses memory allocated to data structures during execution of a computer program, comprising:
    a plurality of executable instructions recorded on non-transitory computer readable media, wherein said instructions, when executed by a digital computing device, cause the device to perform the steps of:
    allocating a plurality of memory regions for use by respective data structures used in execution of said computer program;
    deallocating at least one said data structure during execution of said computer program responsive to at least one instruction in the programming code of said computer program, said deallocating step not immediately freeing any memory region allocated to said at least one said data structure for reuse by said computer program;
    automatically scanning a memory space of said computer program to detect any occurrences of pointers to locations within said at least one data structure deallocated by said deallocating step, said automatically scanning step being performed after said deallocating step, and, with respect to any detected said pointers to locations within said at least one data structure deallocated by said deallocating step, changing each said pointer to a null value; and
    automatically freeing at least one said memory region allocated to a said data structure deallocated by said deallocating step for reuse by said computer program, said automatically freeing step being performed after said changing each said pointer detected by said automatically scanning step to a null value, said automatically freeing step being performed separately from and after said deallocating step.

10. The computer program product of claim 9, wherein said automatically scanning step and said automatically freeing step are performed periodically, each instance of said automatically scanning step and said automatically freeing step being performed with respect to one or more said memory regions deallocated by respective instances of said deallocating step, wherein, for at least some instances of said automatically scanning step and said automatically freeing step, the automatically scanning step instance automatically scans said memory space to detect any occurrences of pointers to any of a plurality of regions deallocated by a respective instance of a plurality of instances of said deallocation step, and the automatically freeing step automatically frees said plurality of regions.

11. The computer program product of claim 10, wherein said instructions, when executed by said digital computing device, further cause the device to perform the step of:
monitoring memory regions deallocated by said deallocating step to determine whether an amount of deallocated memory exceeds a pre-determined threshold;
wherein said automatically scanning step is performed responsive to determining that an amount of deallocated memory exceeds said pre-determined threshold.

12. The computer program product of claim 10, wherein said instructions, when executed by said digital computing device, further cause the device to perform the step of:
monitoring free memory available for allocation to data structures used in execution of said computer program to determine whether an amount of said free memory is less than a pre-determined threshold;
wherein said automatically scanning step is performed responsive to determining that an amount of said free memory is less than said pre-determined threshold.

13. The computer program product of claim 10, wherein said instructions, when executed by said digital computing device, further cause the device to perform the step of:
monitoring memory regions allocated by said allocating step and memory regions deallocated by said deallocating step during execution of said computer program to determine whether a ratio of allocated memory to deallocated memory is less than a pre-determined threshold;
wherein said automatically scanning step is performed responsive to determining that a ratio of allocated memory to deallocated memory is less than said pre-determined threshold.

14. The computer program product of claim 9, wherein said automatically scanning step is performed incrementally by temporarily halting execution of said computer program a plurality of times and performing a respective portion of said scanning step each time the execution of said computer program is temporarily halted.

15. The computer program product of claim 9, wherein said instructions, when executed by said digital computing device, further cause the device to perform the step of:
preventing writing a value to a pointer variable during execution of said computer program if the value points to a location in a deallocated memory region.

16. The computer program product of claim 15, wherein said step of preventing writing a value to a pointer variable during execution of said computer program if the value points to a location in a deallocated memory region comprises the steps of:
responsive to each direction to write a respective value to a corresponding pointer, determining at execution time whether the respective value to be written to the corresponding pointer points to a deallocated memory region; and
responsive to determining that the value to be written to the corresponding pointer points to a deallocated memory region, writing a null value to the corresponding pointer.

17. An apparatus which constructs a computer program in executable form from one or more computer programming source code modules written in a programming language, said programming language supporting the allocation and deallocation of data structures responsive to respective statements in said source code, said apparatus comprising computer-executable instructions embodied in non-transitory computer-readable media for performing the steps of:
parsing a source code file containing source code statements;
providing executable code for allocating a memory region for use by a corresponding data structure during execution of said computer program responsive to identifying a source code statement for allocating a memory region for use by a corresponding data structure;
providing executable code for deallocating a data structure during execution of said computer program responsive to identifying a source code statement for deallocating a data structure, wherein execution of said executable code for deallocating a data structure does not immediately free any memory region corresponding to the data structure for reuse by said executable code for allocating a memory region for use by a corresponding data structure;
providing executable code which, during execution of said computer program, frees memory corresponding to at least one data structure deallocated during execution of said computer program as a result of executing said executable code for deallocating a data structure, said executable code which frees memory: (a) scanning a memory space of said computer program to detect any occurrences of pointers to locations within said at least one data structure deallocated during execution of said computer program as a result of executing said executable code for deallocating a data structure, (b) with respect to any detected said pointers to locations within said at least one data structure deallocated during execution, changing each said pointer to a null value, and (c) freeing the at least one memory region corresponding to said at least one data structure deallocated during execution of said computer program as a result of executing said executable code for deallocating a data structure for reuse by said executable code for allocating a memory region for use by a corresponding data structure only after performing steps (a) and (b).

18. The apparatus of claim 17, wherein said executable code which, during execution of said computer program, frees memory corresponding to at least one data structure deallocated during execution, periodically scans said memory space of said computer program to detect any occurrences of pointers to locations within said at least one deallocated data structure, wherein, for at least some instances of periodically scanning said memory space, said memory space is scanned to detect any occurrences of pointers to locations within a respective plurality of deallocated data structures, said respective plurality of deallocated data structures being deallocated at separate times during execution of said computer program.

19. The apparatus of claim 18, wherein said executable code which, during execution of said computer program, frees memory corresponding to at least one data structure deallocated during execution, monitors at least one of (a) free memory available for allocation to data structures used in execution of said computer program, (b) memory regions allocated to data structures during execution of said computer program, and (c) data structures deallocated during execution of said computer program, to determine whether a pre-determined threshold based on at least one of (a), (b) and (c) is met, and wherein said executable code further performs an instance of said periodically scanning said memory space responsive to determining that said pre-determined threshold has been met.

20. The apparatus of claim 17, wherein said apparatus further provides executable code which, during execution of said computer program, prevents writing a value to a pointer variable if the value points to a location in a data structure deallocated during execution of said computer program.

* * * * *